(12) United States Patent
Yu

(10) Patent No.: US 6,919,384 B2
(45) Date of Patent: Jul. 19, 2005

(54) PROCESS FOR PREPARING A FLEXIBLE POLYURETHANE FOAM

(75) Inventor: Jianming Yu, Brussels (BE)

(73) Assignee: Huntsman International LLC, Salt Lake City, UT (US)

( * ) Notice: Subject to any disclaimer, the term of this patent is extended or adjusted under 35 U.S.C. 154(b) by 26 days.

(21) Appl. No.: 10/645,727

(22) Filed: Aug. 21, 2003

(65) Prior Publication Data

US 2004/0044093 A1 Mar. 4, 2004

Related U.S. Application Data

(63) Continuation of application No. PCT/EP02/00280, filed on Jan. 14, 2003.

(51) Int. Cl.$^7$ .................................. C08G 18/28
(52) U.S. Cl. ................. 521/159; 521/130; 521/137; 521/170; 521/174
(58) Field of Search .................. 521/130, 137, 521/159, 170, 174

(56) References Cited

U.S. PATENT DOCUMENTS

| | | |
|---|---|---|
| 5,063,253 A | 11/1991 | Gansen et al. |
| 5,270,348 A | 12/1993 | Muller et al. |
| 5,441,993 A | 8/1995 | Maretti |
| 5,447,965 A | 9/1995 | Eling |
| 5,459,170 A | 10/1995 | Bleys et al. |
| 5,521,226 A | 5/1996 | Bleys |
| 5,565,498 A | 10/1996 | Chaffanjon et al. |
| 5,596,063 A | 1/1997 | Lutter et al. |
| 5,621,016 A | 4/1997 | Murty et al. |
| 5,668,191 A | 9/1997 | Kinkelaar et al. |
| 5,700,847 A | 12/1997 | Thompson |
| 5,773,483 A | 6/1998 | Eling et al. |
| 6,096,238 A | 8/2000 | Lutter et al. |
| 6,245,825 B1 | 6/2001 | Bleys |
| 6,506,813 B1 | 1/2003 | Parfondry et al. |

FOREIGN PATENT DOCUMENTS

| | | |
|---|---|---|
| EP | 0 220 697 | 5/1987 |
| EP | 0 294 161 | 12/1988 |
| EP | 0 485 953 | 5/1992 |
| EP | 0 547 765 | 6/1993 |
| EP | 0 554 721 | 8/1993 |
| EP | 0 557 792 | 9/1993 |
| EP | 0 676 434 | 10/1995 |
| EP | 0 731 120 | 9/1996 |
| EP | 0 751 114 | 1/1997 |
| EP | 0 865 457 | 9/1998 |
| JP | 56067330 | 6/1981 |
| JP | 9031153 | 2/1997 |
| WO | WO 94/28044 | 12/1994 |
| WO | WO 00/55232 | 9/2000 |
| WO | WO 00/73362 | 12/2000 |
| WO | WO 01/32735 | 5/2001 |
| WO | WO 01/32736 | 5/2001 |

*Primary Examiner*—John M. Cooney, Jr.
(74) *Attorney, Agent, or Firm*—Nicole Graham

(57) ABSTRACT

Process for preparing flexible polyurethane foam by reacting an MDI-based polyisocyanate terminated prepolymer and a polyether polyol with a high oxyethylene content and foams produced by such process.

9 Claims, No Drawings

PROCESS FOR PREPARING A FLEXIBLE POLYURETHANE FOAM

CROSS REFERENCE TO RELATED APPLICATIONS

This application is a continuation of international application PCT EP02/00280, filed Jan. 14, 2003.

FIELD OF THE INVENTION

The present invention is related to a process for preparing a flexible polyurethane foam. More specifically, the present invention is related to a process for preparing a flexible polyurethane foam using a polyoxyethylene polyoxypropylene polyol having a high oxyethylene content and a polyisocyanate-terminated prepolymer made from a polyisocyanate having a high 4,4'-diphenylmethane diisocyanate content (MDI).

BACKGROUND OF THE INVENTION

The prior art discloses processes for preparing flexible foams with a low density and a low resilience from polyols having a high oxyethylene (EO) content and a polyisocyanate having a high 4,4'-MDI content (see e.g. EP 547765). Further, copending application EP 99105419.8 discloses a process for making a flexible polyurethane foam by reacting 4,4'-diphenylmethane diisocyanate, a polyol having a high oxyethylene content, and water.

However, the prior art does not provide a solution to the following problem. Namely, devices suitable for making flexible foams often are used for making flexible foams from different formulations containing different chemicals. It has now been observed that when foams are made from polyols that have a relatively high oxypropylene content (PO-polyol) before foams that are made from polyols having a relatively high oxyethylene content (EO-polyol), a severe deterioration of the later made foam occurs. It is possible that the sever deterioration is caused by a contamination, which may occur, for instance, because small amounts of PO-polyol are left in the polyol tank, the mixing device, and/or the feed from such tank to such device. Such contamination, of course, can be avoided by thoroughly cleaning or flushing the total device. This, however, is laborious, time-consuming, and environmentally less friendly because after flushing a lot of polluted waste material is obtained. Therefore, there is a need to find another solution to this problem.

SUMMARY OF THE INVENTION

Surprisingly, it has now been found that the sensitivity of foam formulations comprising high amounts of EO-polyols to PO-polyols can be greatly reduced by using a special prepolymer.

Therefore, the present invention is concerned with a process for preparing a flexible polyurethane foam comprising reacting a polyisocyanate-terminated prepolymer and an isocyanate-reactive composition in the presence of water wherein the reaction is conducted at an isocyanate index of 70 to 120, the prepolymer has an NCO value of 5–30% by weight, which prepolymer is the reaction product of a polyisocyanate, which consists of:

a) 80–100% by weight of a diphenylmethane diisocyanate comprising at least 40% by weight of 4,4'-diphenylmethane diisocyanate and/or a derivative of said diphenylmethane diisocyanate which derivative is liquid at 25° C., and b) 20–0% by weight of another polyisocyanate, and of a polyether polyol having an average nominal functionality of 2–8, an average equivalent weight of 750–5000, an average molecular weight of 2000–12000 and an oxyethylene content of 50–90% by weight and a polyether polyol having an average nominal hydroxyl functionality of 2–8, an average equivalent weight of 750–5000, an average molecular weight of 2000–12000 and an oxyethylene content of 0–25% by weight, these two polyether polyols being used in a weight ratio of from 10:90 to 90:10, and wherein the isocyanate-reactive composition consists of a) 80–100% by weight of a polyether polyol having an average nominal functionality of 2–8, an average equivalent weight of 750–5000, an average molecular weight of 2000–12000 and an oxyethylene content of 50–90% by weight and b) 20–0% by weight of one or more other isocyanate-reactive compounds not being water.

Further, the present invention is related to flexible polyurethane foams obtainable according to this process and to flexible polyurethane foams obtained by this process.

DETAILED DESCRIPTION OF THE INVENTION

The present invention is concerned with a process for preparing a flexible polyurethane foam comprising reacting a polyisocyanate-terminated prepolymer and an isocyanate-reactive composition in the presence of water wherein the reaction is conducted at an isocyanate index of 70 to 120, the prepolymer has an NCO value of 5–30% by weight, which prepolymer is the reaction product of a polyisocyanate, which consists of:

a) 80–100% by weight of a diphenylmethane diisocyanate comprising at least 40% by weight of 4,4'-diphenylmethane diisocyanate and/or a derivative of said diphenylmethane diisocyanate which derivative is liquid at 25° C., and b) 20–0% by weight of another polyisocyanate, and of a polyether polyol having an average nominal functionality of 2–8, an average equivalent weight of 750–5000, an average molecular weight of 2000–12000 and an oxyethylene content of 50–90% by weight and a polyether polyol having an average nominal hydroxyl functionality of 2–8, an average equivalent weight of 750–5000, an average molecular weight of 2000–12000 and an oxyethylene content of 0–25% by weight, these two polyether polyols being used in a weight ratio of from 10:90 to 90:10, and wherein the isocyanate-reactive composition consists of a) 80–100% by weight of a polyether polyol having an average nominal functionality of 2–8, an average equivalent weight of 750–5000, an average molecular weight of 2000–12000 and an oxyethylene content of 50–90% by weight and b) 20–0% by weight of one or more other isocyanate-reactive compounds not being water.

Further, the present invention is related to flexible polyurethane foams obtainable according to this process and to flexible polyurethane foams obtained by this process.

By using the above special prepolymer the sensitivity to PO-polyols is greatly reduced.

If foams in a mould are made, these foams can be easily demoulded even without the use of internal mould release agents and without the repetitive use of external mould release agents, as described in copending application EP 99105419.8.

Still further, these foams show good values for resilience, tear strength, creep, elongation, and compression set, especially at lower density. In the following table, general and preferred ranges of these properties are shown for the foams according to the present invention, together with the way they are measured.

|  | general range | preferred range | method of measurement |
|---|---|---|---|
| Tear strength, N/m | 100–500 | 150–400 | ISO/DIS8067 |
| Creep, % | 2–5 | 2.2–4.5 | see below * |
| Elongation, % | 100–200 | 120–200 | ISO 1798 |
| Compression set (dry, 50%), % | 1–15 | 1–10 | ISO 1856 |
| (humid, 50%), % | 0–10 | 0–8 |  |

* Creep is measured by the method disclosed in Utech '94 proceedings, Paper 5 of A. Cunningham et al, pages 1–6.

In the context of the present invention the following terms have the following meaning:
1) isocyanate index or NCO index or index:
   the ratio of NCO-groups over isocyanate-reactive hydrogen atoms present in a formulation, given as a percentage:

$$\frac{[NCO]}{[active\ hydrogen]} \times 100\ (\%).$$

In other words, the NCO-index expresses the percentage of isocyanate actually used in a formulation with respect to the amount of isocyanate theoretically required for reacting with the amount of isocyanate-reactive hydrogen used in a formulation.
   It should be observed that the isocyanate index as used herein is considered from the point of view of the actual foaming process involving the isocyanate ingredients and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of the water) present at the actual foaming stage are taken into account.
2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual foaming process one hydroxyl group is considered to comprise one reactive hydrogen, one primary amine group is considered to comprise one reactive hydrogen and one water molecule is considered to comprise two active hydrogens.
3) Reaction system: a combination of components wherein the polyisocyanates are kept in one or more containers separate from the isocyanate-reactive components.
4) The expression "polyurethane foam" as used herein refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams) and with polyols, aminoalcohols and/or polyamines as isocyanate-reactive compounds.
5) The term "average nominal hydroxyl functionality" or "average nominal functionality" is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.
6) The word "average" refers to number average unless indicated otherwise.

Preferably, the polyisocyanate a) is selected from 1) diphenylmethane diisocyanate comprising at least 40%, preferably at least 60% and most preferably at least 70% by weight of 4,4'-diphenylmethane diisocyanate, 2) a carbodiimide and/or uretonimine modified variant of polyisocyanate 1), the variant having an NCO value of 20% by weight or more, 3) a urethane modified variant of polyisocyanate 1), the variant having an NCO value of 20% by weight or more and being the reaction product of an excess of polyisocyanate 1) and of a polyol having an average nominal hydroxyl functionality of 2–4 and an average molecular weight of at most 1000, and 4) mixtures of any of the aforementioned polyisocyanates.

Polyisocyanate 1) comprises at least 40% by weight of 4,4'-MDI. Such polyisocyanates are known in the art and include pure 4,4'-MDI, isomeric mixtures of 4,4'-MDI and up to 60% by weight of 2,4'-MDI and 2.2'-MDI. It is to be noted that the amount of 2,2'-MDI in the isomeric mixtures is rather at an impurity level and in general will not exceed 2% by weight, the remainder of up to 60% by weight being 2,4'-MDI. Polyisocyanates as these are known in the art and commercially available (e.g. SUPRASEC® MPR isocyanate, which is commercially available from Huntsman International LLC).

The carbodiimide and/or uretonimine modified variants of the above polyisocyanate 1) are also known in the art and commercially available (e.g. SUPRASEC® 2020 isocyanate, which is commercially available from Huntsman International LLC).

Urethane modified variants of the above polyisocyanate 1) are also known in the art and commercially available (e.g. SUPRASEC® 2015 isocyanate, which is commercially available from Huntsman International LLC). The other polyisocyanate b) may be chosen from aliphatic, cycloaliphatic, araliphatic and, preferably, aromatic polyisocyanates, such as toluene diisocyanate in the form of its 2,4 and 2,6-isomers and mixtures thereof and mixtures of diphenylmethane diisocyanates (MDI) and oligomers thereof having an isocyanate functionality greater than 2 known in the art as "crude" or polymeric MDI (polymethylene polyphenylene polyisocyanates). Mixtures of toluene diisocyanate and polymethylene polyphenylene polyisocyanates may be used as well. Preferred polyisocyanates do not contain the other polyisocyanate b).

The polyol having an oxyethylene content of 50–90% by weight, which is used in the prepolymer and the isocyanate-reactive composition, is selected from polyether polyols, which contain other oxyalkylene groups like oxypropylene and/or oxybutylene groups; preferably, these polyether polyols are polyoxyethylene polyoxypropylene polyols. These polyols have an average nominal functionality of 2–8 and preferably of 2–6, an average equivalent weight of 750–5000 and preferably of 1000–4000 and a molecular weight of 2000–12000 and preferably of 2000–10000 and preferably have an oxyethylene content of 60–85% by weight. The distribution of the oxyethylene and other oxyalkylene groups over the polymer chains may be of the type of a random distribution, a block copolymer distribution or a combination thereof. Mixtures of polyols may be used. Methods to prepare such polyols are known and such polyols are commercially available; examples are ARCOL 2580 polyol from Bayer, CARADOL 3602 polyol from Shell and LUPRANOL 9205 polyol from BASF, and DALTOCEL® F442 polyol from Huntsman International LLC.

The polyols having an oxyethylene content of 50–90% by weight, which are used in the prepolymer and as polyol a) may be the same or different.

The polyol having an oxyethylene content of 0–25% by weight which is used in the prepolymer is selected from polyoxypropylene polyols and polyoxyethylene polyoxypropylene polyols having the above oxyethylene content. These polyols have an average nominal functionality of 2–8 and preferably of 2–6, an average equivalent weight of 750–5000 and preferably of 1000–4000 and a molecular weight of 2000–12000 and preferably of 2000–10000 and preferably have an oxyethylene content of 5–20% by weight. The distribution of the oxyethylene and other oxyalkylene groups over the polymer chains may be of the type of a random distribution, a block copolymer distribution or a combination thereof. Most preferred amongst these are those with all oxyethylene groups at the end of the polymer chains (so called tipped or capped). Mixtures of polyols may be used. Methods to prepare such polyols are known and such polyols are commercially available (e.g. DALTOCEL® F428 polyol and DALTOCEL® F460 polyol).

The relative amount of the polyol having an oxyethylene content of 50–90% by weight and the polyol having an oxyethylene content of 0–25% by weight, used in the prepolymer is 90:10–10:90 (w:w) and preferably 30:70–70:30 (w:w) and most preferably 40:60–60:40 (w:w). The prepolymers are prepared in known manner. Preferably, the polyols are premixed and then combined with the polyisocyanate, which is used in excess. It is not necessary to use all polyisocyanate, which is to be used in the preparation of the foam, in the prepolymer preparation; if only a part of the polyisocyanate is used in the prepolymer preparation, the other part will be added after the prepolymer preparation. More preferably, all or part of polyisocyanate a) is used in the preparation of the prepolymer while all of polyisocyanate b), if used, is added to the prepolymer after its preparation. The relative amount of the polyisocyanate and the polyols in the preparation of the prepolymer will depend on the desired NCO-value, the specific polyisocyanate and polyols chosen and the relative amounts of the polyols chosen; it can be calculated in known manner by those skilled in the art once above choices have been made. The prepolymer is made by combining the polyisocyanate and the polyols and allowing them to react. Reaction in general may be conducted at a temperature of 15–100° C.; if desired a catalyst enhancing urethane-group formation can be used. The NCO value of the prepolymer preferably is 10–25% by weight. The amount of the polyether polyol a) in the isocyanate-reactive composition used in the preparation of the foam is preferably at least 30% by weight calculated on the weight of the polyisocyanate-terminated prepolymer.

The other isocyanate-reactive compounds, which may be used in an amount of 0–20% by weight and preferably 0–10% by weight, may be selected from polyether polyamines, polyester polyols and polyether polyols (different from the above described ones) having a molecular weight of 2000 or more and in particular from such other polyether polyols, which may be selected from polyoxyethylene polyols, polyoxypropylene polyols, polyoxyethylene polyoxypropylene polyols having an oxyethylene content of less than 50% or more than 90% by weight. Preferred polyoxyethylene polyoxypropylene polyols are those having an oxyethylene content of 5–30% and preferably 10–25% by weight, wherein all or part of the oxyethylene groups are at the end of the polymer chains (so-called EO-tipped polyols). Preferably, these other polyether polyols have an average nominal functionality of 2–8, more preferably 2–6 and an average molecular weight of 2000–12000, more preferably of 2000–10000. Further, the other isocyanate-reactive compounds may be selected from chain extenders and cross-linkers, which are isocyanate-reactive compounds having an average molecular weight below 2000, preferably up to 1000 and a functionality of 2–8. Examples of such chain-extenders and cross-linkers are ethylene glycol, butanediol, diethylene glycol, propylene glycol, dipropylene glycol, glycerol, trimethylolpropane, pentaerythritol, sucrose, sorbitol, mono-, di- and triethanolamine, ethylenediamine, toluenediamine, diethyltoluene diamine, polyoxyethylene polyols having an average nominal functionality of 2–8 and an average molecular weight of less than 2000 like ethoxylated ethylene glycol, butane diol, diethylene glycol, propylene glycol, dipropylene glycol, glycerol, trimethylol propane, pentaerythritol, sucrose and sorbitol having said molecular weight, and polyether diamines and triamines having an average molecular weight below 2000.

Mixtures of the aforementioned other isocyanate-reactive compounds may be used as well. Most preferred other isocyanate-reactive compounds are selected from the aforementioned polyols having an oxyethylene content of 5–30% by weight, polyoxyethylene polyols, chain-extenders, cross-linkers and mixtures thereof.

The polyols may comprise dispersions or solutions of addition or condensation polymers in polyols of the types described above. Such modified polyols, often referred to as "polymer polyols" have been fully described in the prior art and include products obtained by the in situ polymerisation of one or more vinyl monomers, for example styrene and/or acrylonitrile, in the above polyether polyols, or by the in situ reaction between a polyisocyanate and an amino- and/or hydroxy-functional compound, such as triethanolamine, in the above polyol. Polyoxyalkylene polyols containing from 1 to 50% by weight of dispersed polymer are particularly useful. Particle sizes of the dispersed polymer of less than 50 microns are preferred.

During the last years, several methods have been described to prepare polyether polyols having a low level of unsaturation. These developments have made it possible to use polyether polyols at the higher end of the molecular weight range since such polyols can now be prepared with an acceptably low level of unsaturation. According to the present invention, polyols having a low level of unsaturation may be used as well. In particular, such high molecular weight polyols having a low level of unsaturation may be used.

Most preferably, the amount of polyols having an average nominal functionality of 2–8, an average equivalent weight of 750–5000, an average molecular weight of 2000–12000 and an oxyethylene content of 50–90% by weight calculated on the total amount of isocyanate-reactive compounds used in making the foam (including those used in making the variants) is more than 90% by weight.

Still further, the following optional ingredients may be used: catalysts enhancing the formation of urethane bonds like tin catalysts like tin octoate and dibutyltindilaurate, tertiary amine catalysts like triethylenediamine and imidazoles like dimethylimidazole and other catalysts like maleate esters and acetate esters; surfactants; fire retardants; smoke suppressants; UV-stabilizers; colorants; microbial inhibitors; fillers; internal mould release agents (such agents may be used to further enhance the release of the materials made but are not essential) and external mould release agents (such agents preferably are only used at the beginning of the first moulding).

One of the special features of the present invention is that preferably the foams are made by reacting the ingredients in the absence of tin catalysts. Despite the fact that no tin catalyst is used, still flexible foams are obtainable with a low density, a high resilience and other good properties.

Another class of catalysts, which may be used in preparing the foams, is an alkali metal or alkaline earth metal carboxylate salt. The catalyst may be a salt of any metal of Groups IA and IIA of the Periodic Table but in general the alkali metal salts are preferred like potassium and sodium salts, especially the potassium salts. If desired mixtures of such salts may be used like a mixture of a potassium and a sodium salt.

A catalytically effective amount of the salt will usually be in the range of 0.1 to 5, preferably 0.2–3 parts by weight per 100 parts by weight of reactants.

The carboxylate may be selected from aliphatic carboxylates having 2–10 carbon atoms like acetate, hexanoate, 2-ethylhexanoate and octanoate.

Especially the carboxylate may be selected from those having the formula:

R—E—A—COO—wherein

A is a hydrocarbon diradical having 1–6 preferably 1–3 carbon atoms;

R is X—R$_1$—(OR$_2$)$_n$— wherein X is CH$_3$— or OH—, R1 is a hydrocarbon diradical having 1–8 and preferably 1–4 carbon atoms, R2 is a hydrocarbon diradical having 2–4 and preferably 2 or 3 carbon atoms and n is 0 to 10, preferably 0–5.

A may be selected from diradicals like —CH$_2$—, —CH$_2$CH$_2$—, —CH$_2$CH$_2$CH$_2$—, —CH=CH—CH$_2$—,

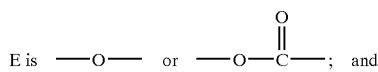

—CH=CH—,

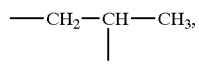

The most preferred diradical is

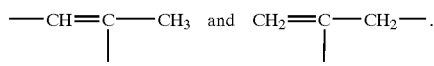

R$_1$ may be selected from those diradicals mentioned for A and from radicals obtained by removing two hydrogen atoms from e.g. butane, pentane, hexane and octane. The most preferred radicals for R$_1$ are methylene, ethylene, trimethylene, tetramethylene and propylene.

R$_2$ may be selected from ethylene, trimethylene, tetramethylene, ethylethylene and propylene. Most preferred groups are ethylene and propylene.

Such catalysts and their preparation are known (see e.g. EP 294161, EP 220697 and EP 751114).

Examples of catalysts are sodium acetate, potassium acetate, potassium hexanoate, potassium 2-ethylhexanoate, potassium ethoxyacetate, sodium ethoxyacetate, the potassium salt of the hemi-ester of maleic acid and ethoxyethane, ethoxyethoxyethane, ethylene glycol, diethylene glycol, triethylene glycol, tetraethylene glycol, propylene glycol, dipropylene glycol, tripropylene glycol, methanol, ethanol, propanol or butanol and the potassium salt of the hemi-ester of such hydroxy containing compounds with malonic, succinic, glutaric, adipic or fumaric acid. Mixtures of these catalysts may be used as well.

Water is used as blowing agent optionally together with other blowing agents known in the art like hydrocarbons, so called CFC's and HCFC's, N$_2$ and CO$_2$. Most preferably water is used as the blowing agent, optionally together with CO$_2$. The amount of blowing agent will depend on the desired density. The amount of water will be between 0.8–5% by weight, calculated on the amount of all other ingredients used and depends on the density desired.

The reaction to prepare the foams is conducted at an NCO index of 70–120 and preferably of 80–110. The flexible foams may have free rise densities varying from 15 to 150 kg/m$^3$ and preferably from 15 to 80 and most preferably from 25 to 70 kg/m$^3$ (ISO 845).

The foams may be made according to the free-rise process, the slabstock process, or the moulding process.

The moulding process may be conducted with restricted and unrestricted foam rise. Unrestricted foam rise is feeding the ingredients, used to make the foam, in an open container and allowing the foam to form and rise without a closed upper lid or without a weight onto the rising foam. Restricted foam rise is allowing the foam to rise in a container with a weight onto the rising foam or allowing the foam to rise in a closed mould. The moulding process may be conducted in any type of mould known in the art. Examples of such moulds are the moulds commercially used for making polyurethane furniture parts, automotive seating and other automotive parts, like arm-rests and head-rests. The moulding process is a so-called cold-cure moulding process wherein the ingredients used for making the foam are fed into the mould at a temperature of from ambient temperature up to 80° C. and preferably up to 70° C., the mould being kept at a temperature of from ambient temperature up to 80° C. and preferably up to 70° C. during the process. After demoulding the foams are optionally cured for a period of 1 hour to 2 days at a temperature of ambient to 100° C. and preferably of ambient temperature to 70° C.

The isocyanate-reactive ingredients may be pre-mixed, optionally together with the optional ingredients, before being brought into contact with the polyisocyanate. Alternatively, they may be brought into contact with the polyisocyanate via separate feeds.

The invention is illustrated by the following non-limiting examples.

EXAMPLES

Example 1

The following polyoxyethylene polyoxypropylene polyols were used:

|  | OH value, mg KOH/g | average nominal functionality | oxyethylene content, % w |
| --- | --- | --- | --- |
| polyol 1 | 28 | 3 | 15 (all tipped) |
| polyol 2 | 42 | 3 | 75 (random) |
| polyol 3 | 30 | 2 | 14 (all tipped) |
| polyol 4 | 187 | 6 | 100 |
| polyol 5 | 38 | 3 | 76 |
| polyol 6 | 31 | 3 | 75 (random) |
| polyol 7 | 31 | 3 | 75 (5% tip) |

The following polyisocyanates were used:

Polyisocyanate 1: a 30/70 w/w mixture of a uretonimine/carbodiimide modified polyisocyanate having an NCO value of 29.5% by weight and 4,4'-MDI.

Polyisocyanate 2: An isocyanate-terminated prepolymer having an NCO value of about 15% by weight prepared by reacting 48.5 pbw of MDI comprising about 19% by weight of 2,4'-MDI and a mixture of 25.1 pbw of polyol 2 and 26.4 pbw of polyol 3.

Other ingredients:
D33LV: amine catalyst, available from Air Products.
B4113: silicone surfactant from Goldschmidt.
NIAX A1 catalyst: amine catalyst, available from Osi Chemicals.

The physical properties were measured by the following methods:
free rise density, kg/m$^3$: ISO 845
compression load deflection (kPa, 40%): ISO 3386/1 (CLD)
hysteresis loss, %: ISO 3386/1 (HL)
tear max (N/m): ISO 8067 (TM)
elongation, %: ISO 1798
resilience, %: ISO 8307

The polyols, catalysts, surfactant and water were mixed and then combined with the polyisocyanate and allowed to react. The amounts in parts by weight and the physical properties are indicated in below Table. In the Table, the following symbols have the following meaning:

\* foam collapsed; it had no value

\*\* open foam

\*\*\* very closed foam, severe shrinkage

Examples 1 and 10–13 are comparative examples. The foams according to the invention were foams having nice open cells and showed little or no shrinkage.

2000–12000, and an oxyethylene content of 50–90% by weight, and
(iv) a second polyether polyol having an average nominal hydroxyl functionality of 2–8, an average equivalent weight of 750–5000, an average molecular weight of 2000–12000, and an oxyethylene content of 0–25% by weight,
wherein, the first polyether polyol and the second polyether polyol are used in a weight ratio of from 30:70 to 70:30 and
(b) an isocyanate-reactive composition consisting of:
(i) 80–100% by weight of a polyether polyol having an average nominal functionality of 2–8, an average equivalent weight of 750–5000, an average molecular weight of 2000–12000, and an oxyethylene content of 50–90% by weight, and
(ii) 20–0% by weight of one or more other isocyanate-reactive compounds other than water; in the presence of water, wherein the reaction is conducted at an isocyanate index of 70 to 120 and the polyisocyanate-terminated prepolymer has a NCO value of 5–30% by weight.

2. The process according to claim 1, wherein the polyisocyanate-terminated prepolymer prepolymer has a NCO value of 10–25% by weight and the diphenylmethane diisocyanate comprises at least 70% by weight of 4,4'-diphenylmethane diisocyanate and/or a derivative of said diphenylmethane diisocyanate that is liquid at 25° C.

| Example | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Polyisocyanate 1 | — | — | — | — | — | — | — | — | — | 47 | 47 | 47 | 47 | — | — | — | — | — | — |
| Polyisocyanate 2 | 100 | 100 | 100 | 100 | 100 | 100 | 100 | 100 | 100 | — | — | — | — | 100 | 100 | 100 | 100 | 100 | 100 |
| Polyol 1 | 50 | — | — | — | — | — | | | | — | 0.1 | 0.5 | 1 | — | 0.1 | 0.5 | 1 | | |
| Polyol 2 | — | — | — | — | — | — | | | | | | | | | | | | 90 | |
| Polyol 4 | — | — | — | | | | | | | 5 | 5 | 5 | 5 | | | | | | |
| Polyol 5 | — | 50 | 100 | | | | | | | 100 | 100 | 100 | 100 | 75 | 75 | 75 | 75 | | |
| Polyol 6 | — | — | — | — | — | — | 50 | 75 | 100 | | | | | | | | | | 90 |
| Polyol 7 | | | | 50 | 75 | 100 | — | — | — | | | | | | | | | | |
| D33LV | 0.8 | 0.8 | 0.8 | 0.8 | 0.8 | 0.8 | 0.8 | 0.8 | 0.8 | 0.5 | 0.5 | 0.5 | 0.5 | 0.8 | 0.8 | 0.8 | 0.8 | 0.6 | 0.6 |
| NIAX A1 catalyst | — | — | — | — | — | — | — | — | — | | | | | 0.1 | 0.1 | 0.1 | 0.1 | 0.1 | 0.1 |
| B4113 | 0.8 | 0.8 | 0.8 | 0.8 | 0.8 | 0.8 | 0.8 | 0.8 | 0.8 | | | | | 0.8 | 0.8 | 0.8 | 0.8 | 0.8 | 0.8 |
| water | 3 | 3 | 3 | 3 | 3 | 3 | 3 | 3 | 3 | 2.5 | 2.5 | 2.5 | 2.5 | 3 | 3 | 3 | 3 | 3 | 3 |
| index | 97 | 95 | 87 | 97 | 94 | 86 | 97 | 94 | 86 | 99 | 99 | 99 | 99 | 90 | 90 | 90 | 90 | | |
| free rise density | — | 42 | 57 | 41 | 45 | 52 | 41 | 46 | 47 | | | | | 42 | 43 | 44 | 44 | 47 | 52 |
| resilience | | 40 | 58 | 47 | 56 | 64 | 50 | 56 | 61 | | | | | 49 | 52 | 51 | 51 | | |
| CLD | — | 3.0 | 1.4 | 3.9 | 2.8 | 1.6 | 3.9 | 3.3 | 1.7 | | | | | 1.3 | 1.3 | 1.3 | 1.3 | 1.3 | 2.2 |
| HL | — | 30 | 10 | 30 | 22 | 12 | 31 | 23 | 17 | | | | | 12 | 11 | 11 | 11 | 15 | 17 |
| TM | — | — | — | — | — | — | — | — | — | | | | | | | | | 196 | 203 |
| Elongation | — | — | — | — | — | — | — | — | — | | | | | | | | | 183 | 153 |
| comment | \* | | | | | | | | | | \*\* | \*\*\* | \*\*\* | \*\*\* | | | | | |

What is claimed:

1. A process for preparing a flexible polyurethane foam comprising reacting:
   (a) a polyisocyanate-terminated prepolymer consisting of the reaction product of:
      (i) 80–100% by weight of a diphenylmethane diisocyanate comprising at least 40% by weight of 4,4'-diphenylmethane diisocyanate and/or a derivative of said diphenylmethane diisocyanate that is liquid at 25° C.,
      (ii) 20–0% by weight of another polyisocyanate,
      (iii) a first polyether polyol having an average nominal functionality of 2–8, an average equivalent weight of 750–5000, an average molecular weight of 3. The process of claim 2, wherein the first polyether polyol has an average nominal functionality of 2–6, an average equivalent weight of 1000–4000, an average molecular weight of 2000–10000, and an oxyethylene content of 60–85% by weight.

4. The process of claim 2, wherein the second polyether polyol has an average nominal hydroxyl functionality of 2–6, an average equivalent weight of 1000–4000, an average molecular weight of 2000–10000, and an oxyethylene content of 5–20% by weight.

5. The process of claim 3, wherein the second polyether polyol has an average nominal hydroxyl functionality of 2–6, an average equivalent weight of 1000–4000, an average molecular weight of 2000–10000, and an oxyethylene content of 5–20% by weight.

6. The process of claim 2, wherein the polyether polyol (b)(i) has an average nominal functionality of 2–6, an average equivalent weight of 1000–4000, an average molecular weight of 2000–10000, and an oxyethylene content of 60–85% by weight.

7. The process of claim 5, wherein the polyether polyol (b)(i) has an average nominal functionality of 2–6, an average equivalent weight of 1000–4000, an average molecular weight of 2000–10000, and an oxyethylene content of 60–85% by weight.

8. A flexible polyurethane foam obtained according to the process of claim 1.

9. A flexible polyurethane foam obtained according to the process of claim 7.

* * * * *